US012473867B2

(12) United States Patent
Megally et al.

(10) Patent No.: US 12,473,867 B2
(45) Date of Patent: Nov. 18, 2025

(54) INTERNAL COMBUSTION ENGINE TRANSIENT RESPONSE

(71) Applicant: Caterpillar Inc., Peoria, IL (US)

(72) Inventors: Fady A. Megally, Zionsville, IN (US); Chad Koci, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 18/627,316

(22) Filed: Apr. 4, 2024

(65) Prior Publication Data

US 2025/0314212 A1 Oct. 9, 2025

(51) Int. Cl.
 *F02D 41/00* (2006.01)
 *F02D 9/04* (2006.01)
(52) U.S. Cl.
 CPC ........... *F02D 41/0007* (2013.01); *F02D 9/04* (2013.01); *F02D 41/005* (2013.01)
(58) Field of Classification Search
 CPC ....... F02D 41/0007; F02D 9/04; F02D 41/005
 See application file for complete search history.

(56) References Cited

U.S. PATENT DOCUMENTS

| | | | | |
|---|---|---|---|---|
| 2,807,930 A | * | 10/1957 | Bratton | F01N 3/2033 126/299 R |
| 3,007,302 A | * | 11/1961 | Vincent | F02B 41/10 60/624 |
| 3,163,984 A | * | 1/1965 | Dumont | F02B 37/11 60/611 |
| 3,380,245 A | * | 4/1968 | Mick | F01N 3/227 60/303 |
| 3,775,971 A | * | 12/1973 | Gadefelt | F02M 26/05 60/299 |
| 5,943,859 A | | 8/1999 | Kawamura | |
| 6,079,373 A | | 6/2000 | Kawamura | |
| 11,242,809 B2 | | 2/2022 | Ghazi et al. | |
| 2019/0178149 A1 | * | 6/2019 | Schroeder | F02B 37/20 |
| 2022/0381204 A1 | | 12/2022 | Peters et al. | |

FOREIGN PATENT DOCUMENTS

CN 206054053 3/2017

* cited by examiner

*Primary Examiner* — J. Todd Newton
(74) *Attorney, Agent, or Firm* — Schwegman Lundberg & Woessner, P.A.

(57) ABSTRACT

Apparatuses, systems and methods are disclosed including auxiliary system for controlling an enthalpy of air to a turbine of a turbocharger of an internal combustion engine is disclosed. The auxiliary system optionally including: a motive air device configured to receive at least some of the air and produce an airflow of the at least some of the air; an auxiliary heat source in selective fluid communication with the motive air device and configured to heat the airflow; and a controller configured to control operation of the auxiliary heat source and control the airflow to the turbine based upon at least one of a temperature, a pressure and a mass flow rate of the air upstream of or downstream from the turbine.

18 Claims, 2 Drawing Sheets

INTERNAL COMBUSTION ENGINE TRANSIENT RESPONSE

TECHNICAL FIELD

The present disclosure relates to internal combustion engines. More particularly, the present disclosure relates to a system and method that provide an auxiliary air system to improve engine transient response including during engine startup.

BACKGROUND

Machinery, for example, military, agricultural, industrial, construction or other heavy machinery can be propelled by one or more internal combustion engine(s). Internal combustion engines combust a mixture of air and fuel in cylinders and thereby produce drive torque and power. In some applications, the internal combustion engine can be used to drive an electrical generator. When a sudden electrical load is applied on the generator, the internal combustion engine may be required to quickly ramp up speed, so that the generator output meets a minimum frequency and voltage requirement associated with the electrical load.

A turbocharger can be employed on an internal combustion engine for increasing a pressure of intake air (boost) entering combustion chambers of the engine. The turbocharger may be typically driven by a stream of exhaust gases exiting the combustion chambers of the engine. When the internal combustion engine is operating at a low load, the turbocharger may not be able to provide a desired pressure to the intake air to meet any sudden load applied on the internal combustion engine. Put another way, when the internal combustion engine is operating during a cold start, operation of the turbocharger can be limited as the internal combustion engine is unable to provide enough air mass flow to the turbocharger. With the turbocharger inoperable or negatively impacted, the load response and efficiency can be negatively impacted.

Internal combustion engine systems including those used for electrical generation can utilize a turbocharger. Examples of such systems include U.S. Patent Application Publication Nos. 20220381204A1 and 20190178149A1 and Chinese Utility Model 206054053U. However, these systems differ in various ways. For example, these systems utilize bypass lines for exhaust treatment and/or attempt to increase an amount of fuel into combustion chambers based upon the turbocharger operation rate, which are not the focus of the systems and methods of the present application.

SUMMARY

In an example according to this disclosure, an auxiliary system for controlling an enthalpy of air to a turbine of a turbocharger of an internal combustion engine is disclosed. The auxiliary system optionally including: a motive air device configured to receive at least some of the air and produce an airflow of the at least some of the air; an auxiliary heat source in selective fluid communication with the motive air device and configured to heat the airflow; and a controller configured to control operation of the auxiliary heat source and control the airflow to the turbine based upon at least one of a temperature, a pressure and a mass flow rate of the air upstream of or downstream from the turbine.

In another example according to this disclosure, a method of controlling one or more properties of air to a turbine of a turbocharger of an internal combustion engine is disclosed. The method optionally including: flowing at least a portion of the air to the turbine from a supplemental positive airflow generating device; heating the at least the portion of the air to the turbine with an auxiliary heat source; sensing at least one of at least one of a temperature, a pressure and a mass flow rate of the air upstream or downstream of the turbine; based upon the sensing, controlling, with a computing device, the flowing of the at least the portion of the air to the turbine; and based upon the sensing, controlling, with the computing device, an amount of heating applied by the auxiliary heat source to the at least the portion of the air to the turbine.

In yet another example according to this disclosure, an internal combustion engine is disclosed. The internal combustion engine optionally including: an engine block including a plurality of combustion chambers, each of the plurality of combustion chambers being in fluid communication with an air intake manifold and an exhaust manifold; a turbocharger including a compressor shafted to a turbine, wherein the turbine is in fluid communication with the exhaust manifold; and an auxiliary system including: a motive air device in selective fluid communication with and configured to produce an airflow to the turbine; an auxiliary heat source in selective fluid communication with the motive air device and configured to heat the airflow produced by the motive air device; and a controller configured to control operation of the auxiliary heat source and control the airflow to the turbine based upon at least one of a temperature, a pressure and a mass flow rate of a combined airflow including an exhaust airflow from the exhaust manifold and the airflow at a location upstream of or downstream from the turbine.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Examples according to this disclosure are directed to internal combustion engines, auxiliary air intake and exhaust systems thereof and to methods for controlling aspects of the auxiliary systems of the internal combustion engine. Examples of the present disclosure are now described with reference to the accompanying drawings. The following description is merely exemplary in nature and is not intended to limit the present disclosure, application, or use. Examples described set forth specific components, devices, and methods, to provide an understanding of embodiments of the present disclosure. It will be apparent to those skilled in the art that specific details need not be employed and that examples may be embodied in many different forms. Thus, the examples provided should not be construed to limit the scope of the claims.

Figure 1:
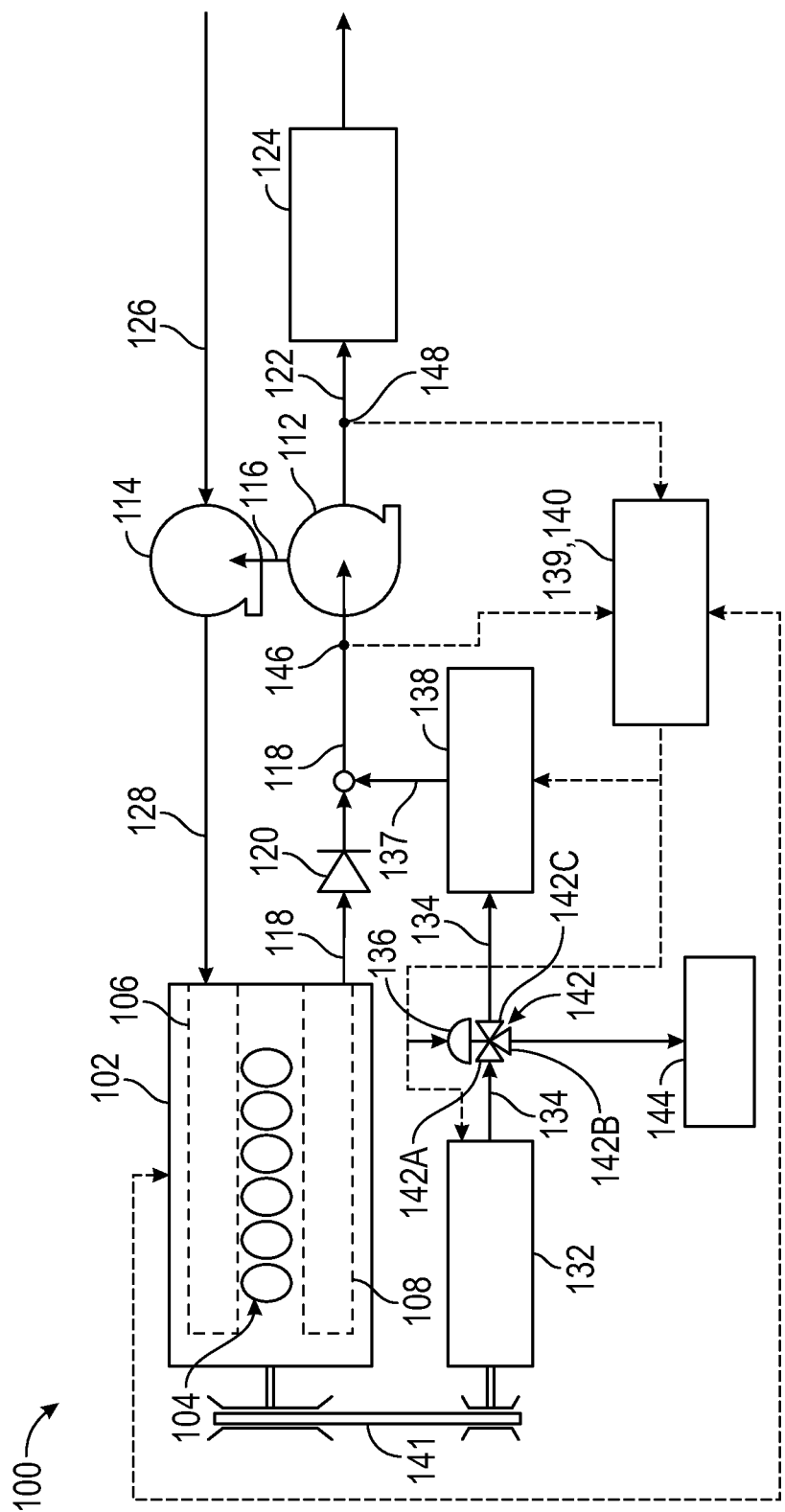
FIG. 1 is schematic illustration of an internal combustion engine having a turbocharger and an auxiliary air system having a motive air device, a controller and an auxiliary heat source to control both mass flow and enthalpy to the turbocharger, in accordance with an example of this disclosure.

FIG. 1 depicts an example schematic illustration of an internal combustion engine 100 in accordance with this disclosure. The internal combustion engine 100 can be used for power generation such as for the propulsion of vehicles or other machinery. The internal combustion engine 100 can include various power generation platforms, including, for example, gasoline, natural gas, diesel or any other desired fuel. It is understood that the present disclosure can apply to any number of piston-cylinder arrangements and a variety of internal combustion engine configurations including, but not limited to, V-internal combustion engines, inline internal combustion engines, and horizontally opposed internal combustion engines, as well as overhead cam and cam-in-block configurations.

In some applications, the internal combustion engines such as internal combustion engine 100 can be used in stationary applications such as for power generation. In other applications the internal combustion engines disclosed can be used with vehicles and machinery that include those related to various industries, including, as examples, construction, military, agriculture, forestry, transportation, material handling, waste management, etc. The internal combustion engine 100 is configured to operatively drive a load, for example, an electrical generator or other device. The internal combustion engine 100 is mechanically coupled to the generator or other device by an output shaft (e.g., a crankshaft).

The internal combustion engine 100 can include an engine block 102, a plurality of combustion chambers 104, an intake manifold 106, and an exhaust manifold 108. The engine block 102 can define various portions of the engine including the crankcase, the plurality of combustion chambers 104, the intake manifold 106, the exhaust manifold 108 and other components known in the art. These other components are not specifically illustrated in FIG. 1.

The internal combustion engine 100 can be provided with the intake manifold 106 being in fluid communication with each of the plurality of combustion chambers 104 by a supply tube or other mechanism corresponding to each of the plurality of combustion chambers 104. The intake manifold 106 is configured to receive a supply of air or a premixed charge that can be operatively supplied to each of the plurality of combustion chambers 104. The internal combustion engine 100 can be provided with the exhaust manifold 108 that is in fluid communication with the plurality of combustion chambers 104 by an exhaust tube or other mechanism corresponding to each of the plurality of combustion chambers 104. The exhaust manifold 108 may be configured to receive a stream of exhaust gases from each of the plurality of combustion chambers 104. Although not specifically shown, the intake manifold 106 and/or the exhaust manifold 108 can be divided into various sections.

As shown in FIG. 1, the internal combustion engine 100 can further include a turbocharger 110 that is fluidly coupled to the internal combustion engine 100. The turbocharger 110 includes a turbine 112 and a compressor 114 mechanically coupled to the turbine 112 through a connecting shaft 116. The turbine 112 is in fluid communication with the exhaust manifold 108 of the internal combustion engine 100 to receive exhaust airflow therefrom via a first exhaust line 118. Optionally, a check valve 120 or other valve or component can regulate flow along the first exhaust line 118.

The turbine 112 is fluidly coupled with a second exhaust line 122, which may direct exhaust gases to an aftertreatment module such as part of an emissions control system(s) including exhaust emissions catalysts 124, a muffler exhaust stack (not shown), or other components. According to further embodiments, the internal combustion engine 100 may include multiple turbochargers.

The emissions control device system(s) can for abating certain diesel engine exhaust constituents or other engine fuel exhaust constituents as part of an exhaust after-treatment system that utilizes Selective Catalytic Reduction (SCR) of nitrogen oxides. According to further examples the emissions control device system(s) can include an oxidation catalyst as one of the exhaust emissions catalysts 124 that functions to absorb oxygen from the exhaust gas providing an opportunity for other elements in the exhaust gas to react with the bonded oxygen. In particular, nitric oxide (NO) may react with the oxygen to form nitrogen dioxide (NO2). When the nitrogen dioxide passes through the one or more treatment units, the nitrogen dioxide may react with the carbon in a soot to form carbon dioxide (CO2), which may then pass through the one or more treatment units such as filter media. The NO2 generated in the filter media may back diffuse through the filter media and react with the soot to form CO2. Some of the NO2 generated may not be fully absorbed or utilized in the regeneration process and, as such, the nitrogen oxide gases (NOx) may be a combination of NO and NO2.

Additionally, the SCR can be configured to reduce the amount of nitrogen oxide gas (NOx) in the exhaust before it is released into the atmosphere. In particular, the SCR may function to react ammonia (NH3) with NOx in the exhaust gas to produce nitrogen and water and, as such, reduce the emission of NOx. The SCR may have a diesel exhaust fluid (DEF) reservoir in fluid communication with the cavity via a controllable valve or nozzle. In one or more examples, the DEF may be in fluid communication with the exhaust stream upstream of the SCR and not directly in the cavity. The SCR may also have one or more of treatment units such as a series of catalysts (again an example of one of the exhaust emissions catalysts 124) arranged within a cavity. For example, the SCR may include a hydrolysis catalyst (again an example of one of the exhaust emissions catalysts 124) adapted to convert liquid urea to ammonia, for example. The SCR may also include an SCR catalyst (again an example of one of the exhaust emissions catalysts 124) to convert the ammonia and NOx to nitrogen and water. The SCR catalysts may include various porous ceramic materials with active catalytic components arranged on the ceramic material. For example, the SCR catalyst may include oxides of base metals such as vanadium, molybdenum, and tungsten, zeolites, or various precious metals may be used. Still other active catalytic components may be used. In one or more examples, the SCR may also include an oxidation catalyst or an ammonia slip catalyst to address any remaining ammonia in the exhaust gas.

The one of the exhaust emissions catalysts 124, including the SCR, can be sufficiently efficient to control NOx conversion during typically low load or warm up conditions if the temperature of the air exhausted by the turbine 112 above a minimum exhaust gas temperature. This minimum exhaust gas temperature can be above 200° C., according to one example. However, maintaining a temperature range for the exhaust gas at between about 175° C. and about 250° C. is contemplated according to further embodiments. The conversion efficiency would be variable and highly dependent on the certification cycle, emissions regulation, and catalyst technology. Temperatures in the range disclosed above would also enable other catalysts to become active, such as diesel oxidation catalysts (DOC) for the reduction of hydrocarbons and conversion of NO to NO2 for increased SCR conversion efficiencies.

The compressor 114 is fluidly coupled to a first air intake line 126 and can draw air through the first air intake line 126 to the compressor 114 from ambient or another source. As further as shown in FIG. 1, the compressor 114 is fluidly coupled to the intake manifold 106 via a second air intake line 128. In one embodiment, the internal combustion engine 100 may can include other components not specifically shown including, but not limited to, an aftercooler, a gas admission valve, or an air throttle valve that may be in fluid communication with the second air intake line 128.

The internal combustion engine 100 can include an auxiliary system 130 configured to provide supplemental air to the turbine 112 of the turbocharger 110 as further discussed herein. The auxiliary system 130 can include a motive air device 132, a first auxiliary line 134, a valve assembly 136, an auxiliary heat source 138, a second auxiliary line 137 and a computing device 139 (e.g., a controller 140).

The motive air device 132 can comprise a positive air flow generating device, such as, but not limited to, a supercharger, a blower or the like. The motive air device 132 can be configured to receive at least some of the air used by the turbine 112 such as from ambient or another source and can produce/generate an airflow of the at least some of the air that is passed along the first auxiliary line 134. The motive air device 132 can be driven by a crankshaft 141 of the internal combustion engine 100, for example. However, the motive air device 132 can be driven by another auxiliary power source including, but not limited to, an electric motor or a hydraulic motor, for example. Although not shown, the motive air device 132 can be coupled to a mechanical coupling such as gearing, a clutch, belt drive system, chain drive system or the like. If the motive air device 132 is a supercharger, the supercharger can include a compressor and other components (e.g., shafting, air filter(s), air lines), as known in the art that are not specifically shown.

The motive air device 132 is in selective fluid communication with the auxiliary heat source 138 via the first auxiliary line 134. The valve assembly 136 can be positioned along the first auxiliary line 134 between the motive air device 132 and the auxiliary heat source 138. The valve assembly 136 can be an electronically controlled valve configured to regulate the airflow of the at least some of the air used by the turbine 112 including an amount of the airflow that reaches the auxiliary heat source 138 and the turbine 112. As an example, the valve assembly 136 can comprise a three-way valve 142 having a first inlet 142A, a first outlet 142B and a second outlet 142C. The three-way valve 142 can be configured to selectively regulate the airflow from the motive air device 132 to ambient via an optional device such as a silencer 144 or muffler according to at least one operation state. More particularly, the three-way valve 142 can be operated to open the first outlet 142B that is in fluid communication with the ambient according to one example when heating by the auxiliary heat source 138 of the airflow is not required (e.g., such as during a steady state operation of the internal combustion engine 100).

The first auxiliary line 134 can be in fluid communication with the auxiliary heat source 138. The auxiliary heat source 138 can be configured to heat the airflow provided thereto by a desired amount. The auxiliary heat source 138 can be a combustor or heater (e.g., electric, viscous, fluid-to-air heat exchanger) configured to heat the airflow.

The second auxiliary line 137 can extend from the auxiliary heat source 138 and can fluidly couple with the first exhaust line 118 upstream of the turbine 112. Such fluid connection can be at or closely adjacent the turbine 112, for example. Thus, the turbine 112 can receive a combined airflow including an exhaust airflow from the internal combustion engine and warmer air comprising the airflow from the motive air device 132 that has been heated by the auxiliary heat source 138.

The computing device 139 (e.g., the controller 140) can be electronically coupled to the motive air device 132, the valve assembly 136, the auxiliary heat source 138, a first sensor(s) 146 and a second sensor(s) 148. The first sensor(s) 146 can be positioned in the first exhaust line 118 upstream of the turbine 112 but downstream of the connection with the second auxiliary line 137, for example. The second sensor(s) 148 can be positioned in the second exhaust line 122 downstream of the turbine 112, for example. However, other locations for the first sensor(s) 146 and/or the second sensor(s) 148 are contemplated such as at respective inlet(s) to or outlet(s) from the turbine 112, for example. Further examples contemplate that the first sensor(s) can be positioned in the second auxiliary line 137 or in the auxiliary heat source 138, for example. Yet further examples contemplate the use of a single sensor or sensors in a single location rather than the two locations for the first sensor(s) 146 and the second sensor(s) 148 illustrated in the example of FIG. 1.

As further discussed herein, the controller 140 can be configured to control operation of the auxiliary heat source 138 and control the airflow to the turbine 112 based upon at least one of a temperature, a pressure and a mass flow rate of the air (e.g., the combined airflow) upstream of or downstream from the turbine 112. More particularly, the one or more properties (e.g., the temperature, the pressure, the mass flow rate of the air, etc.) can be obtained using the first sensor(s) 146 and/or second sensor(s) 148. The controller 140 can be configured to determine an enthalpy of the air (e.g., the combined airflow) upstream and/or downstream of the turbine 112, for example. Based upon the enthalpy, the temperature, the pressure, the mass flow rate of the air and/or one or more other properties, the controller 140 can be configured to control the valve assembly 136 to regulate the airflow from the motive air device 132 to the auxiliary heat source 138. Additionally or alternatively, based upon the enthalpy, temperature, the pressure, the mass flow rate of the air and/or one or more other properties, the controller 140 can be configured to control operation of the motive air device 132 (e.g., engage or disengage the clutch, reduce speed of a variable speed motor, turn off the motor, engage a gearing system to vary the speed of operation, etc.) to control the airflow to the turbine 112. Additionally or alternatively, based upon the enthalpy, temperature, the pressure, the mass flow rate of the air and/or one or more other properties, the controller 140 can be configured to control operation of the auxiliary heat source 138.

According to one example, the controller 140 can be configured to control operation of the auxiliary heat source 138 and control the airflow to the turbine 112 (e.g., via control of the valve assembly 136 and/or the motive air device 132) based upon one or more requirements of exhaust emissions catalysts 124 positioned downstream of and in fluid communication with the turbine 112. Thus, an amount of heating of the airflow by the auxiliary heat source 138 and a rate or volume of the airflow to the turbine 112 can controlled by the controller 140 to maintain the temperature of the air exhausted by the turbine 112 above a minimum exhaust gas temperature (e.g., at or above 200° C.) for the exhaust emissions catalysts 124 to achieve one or more target conversion efficiencies. According to another example, an amount of heating of the airflow by the auxiliary heat source 138 and a rate (or volume) of the airflow to the turbine 112 can be controlled by the controller 140 to substantially balance at least one of a load response and a speed response of the compressor 114 of the turbocharger 110 with at least one of a load requirement and a speed requirement of the internal combustion engine during a transient operation state (e.g., when the internal combustion engine 100 needs to intentionally transition from a first lower load and/or speed state to a second increased load and/or speed state) to meet the sudden increase in the load or speed requirement on the internal combustion engine. Such transient operation state can occur during startup and when the internal combustion engine is subject to increased load and/or speed requirement (e.g., to suddenly respond to an electrical load applied on the generator, to break into a heap, to accelerate a vehicle, etc.).

The controller 140 can be a dedicated controller for the auxiliary system 130 or can be a sub-component or sub-routine of an engine control unit (ECU) of the internal combustion engine 100. The controller 140 can include memory (not shown), display, input and other features and components. The controller 140 can include, for example, software, hardware, and combinations of hardware and software configured to execute functions related to control of the various component so the auxiliary system 130 as discussed previously. The controller 140 can include an analog, digital, or combination analog and digital controller including a number of components. As examples, the controller 140 can include integrated circuit boards or ICB(s), printed circuit boards PCB(s), processor(s), data storage devices, switches, relays, or any other components. Examples of processors can include any one or more of a microprocessor, a controller, a digital signal processor (DSP), an application specific integrated circuit (ASIC), a field-programmable gate array (FPGA), or equivalent discrete or integrated logic circuitry.

The controller 140 can include or can be coupled to memory such as storage media to store and/or retrieve data or other information such as, for example, enthalpy calculations or charts, desired flow rates or volumes of airflow based upon efficiency of the auxiliary heat source 138, desired proportions of mixing of exhaust gas from the internal combustion engine with the airflow of the at least some of the air from the motive air device 132 based upon relative temperatures of the two different airflows, etc. The controller 140 via memory may also store other information. Storage devices, in some examples, are described as a computer-readable storage medium. The memory can be used to store program instructions for execution by the controller 140, for example. The memory, for example, is used by software, applications, algorithms, as examples, running on and/or executed by the controller 140. The memory can include short-term and/or long-term memory and can be volatile and/or non-volatile. Examples of non-volatile storage elements include magnetic hard discs, optical discs, floppy discs, flash memories, or forms of electrically programmable memories (EPROM) or electrically erasable and programmable (EEPROM) memories. Examples of volatile memories include random access memories (RAM), dynamic random access memories (DRAM), static random access memories (SRAM), and other forms of volatile memories known in the art.

Figure 2:
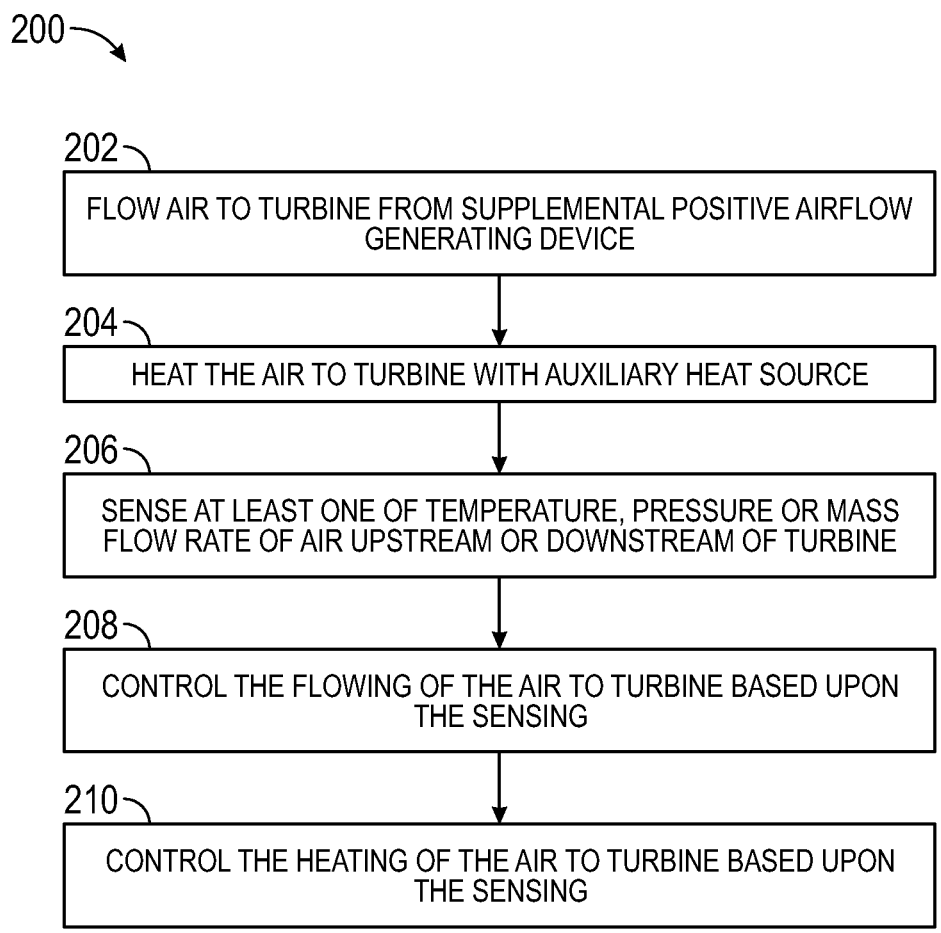
FIG. 2 is a flowchart depicting a method for operating an auxiliary air system of the internal combustion engine with an auxiliary heat source controlled to provide a desired enthalpy to a turbocharger of the internal combustion engine, in accordance with an example of this disclosure.

FIG. 2 illustrates a method 200 of controlling one or more properties (e.g., the temperature, the pressure, the mass flow rate of the air and/or enthalpy, etc.) of air to a turbine of a turbocharger of an internal combustion engine. The method 200 can include flowing 202 at least a portion of the air to the turbine from a supplemental positive airflow generating device. The method 200 can include heating 204 the at least the portion of the air to the turbine with an auxiliary heat source. The method 200 can include sensing 206 at least one of at least one of a temperature, a pressure and a mass flow rate of the air upstream or downstream of the turbine. The method 200 can include, based upon the sensing, controlling 208, with a computing device, the flowing of the at least the portion of the air to the turbine. The method 200 can include based upon the sensing, controlling 210, with the computing device, an amount of heating applied by the auxiliary heat source to the at least the portion of the air to the turbine.

The method 200 can optionally include that the controlling with the computing device the flowing of the at least the portion of the air to the turbine includes regulating the at least the portion of the air with a valve assembly. The regulating includes directing at least some of the at least the portion of the air to the turbine to atmosphere rather than to the turbine. The controlling with the computing device the flowing of the at least the portion of the air to the turbine includes varying a speed of an motive air device that generates the flowing of the at least the portion of the air to the turbine.

The method 200 can further include passing the air from the turbine through exhaust emissions catalysts in fluid communication therewith, wherein the controlling the amount of heating applied by the auxiliary heat source and the controlling the flowing of the at least the portion of the air to the turbine are controlled by the computing device to maintain the temperature of the air exhausted by the turbine above a minimum exhaust gas temperature for the exhaust emissions catalysts to achieve one or more target conversion efficiencies. The method 200 can include the amount of heating applied by the auxiliary heat source and the controlling the flowing of the at least the portion of the air to the turbine are controlled by the computing device to substantially balance at least one of a load response and a speed response of a compressor of the turbocharger with at least one of a load requirement and a speed requirement of the internal combustion engine during a transient operation state of the internal combustion engine. The amount of heating applied by the auxiliary heat source and the controlling the flowing of the at least the portion of the air to the turbine can be controlled by the computing device based upon one or more requirements of exhaust emissions catalysts positioned downstream of and in fluid communication with the turbine. The computing device can be configured to determine an enthalpy of the air upstream or downstream of the turbine, and wherein the air is a combined airflow including an exhaust airflow from the internal combustion engine and an airflow of the at least the portion of the air.

INDUSTRIAL APPLICABILITY

In operation, the internal combustion engine 100 can be configured to combust fuel to generate power. During operation, the internal combustion engine 100 can be subject to transient operation states such as transient load and/or transient speed (e.g., during startup, to suddenly respond to an electrical load applied on the generator, to break into a heap, to accelerate a vehicle, etc.) that interrupt a steady state operation state.

During transient load or transient speed for example, additional air can be provided to the turbine 112 from the motive air device 132. The addition of the air to the turbine 112 can impart an additional kinetic energy to the turbine 112 thereby driving the compressor 114 at a speed greater than would be possible without the turbine 112. Accordingly, the turbine 112 is able to drive the compressor 114 at a greater speed to provide a greater intake air pressure in the intake manifold 106 for combustion. This configuration can enable the internal combustion engine 100 to have a faster response during the transient operation states (i.e. when the internal combustion engine 100 is transitioning from the low load and/or speed to meet the sudden application of load and/or speed on internal combustion engine 100).

The systems and methods of the present application improve the responsiveness of the internal combustion engine to transient load and/or transient speed requirements further by heating the airflow provided by the motive air device 132 with the auxiliary heat source 138. This heated supplemental air can provide further additional kinetic energy to the turbine 112 thereby driving the compressor 114 at a speed greater than would be possible without application of the heating. Thus, the controller 140 can be configured to control an amount of heating of the airflow by the auxiliary heat source 138 and a rate (or volume) of the airflow to the turbine 112 can be controlled by the controller 140 to substantially balance at least one of a load response and a speed response of the compressor 114 of the turbocharger 110 with at least one of a load requirement and a speed requirement of the internal combustion engine during a transient operation state.

Additionally, the systems and methods of the present application contemplate further improvement by reducing emissions during transient operation state as the controller 140 can be configured to control operation of the auxiliary heat source 138 and control the airflow to the turbine 112 (e.g., via control of the valve assembly 136 and/or the motive air device 132) based upon one or more requirements of exhaust emissions catalysts 124 positioned downstream of and in fluid communication with the turbine 112. Thus, an amount of heating of the airflow by the auxiliary heat source 138 and a rate or volume of the airflow to the turbine 112 can controlled by the controller 140 to maintain the temperature of the air exhausted by the turbine 112 above a minimum exhaust gas temperature for the exhaust emissions catalysts 124 to achieve one or more target conversion efficiencies.

According to one example, during operation if there is a need or desire to increase a temperature of the airflow downstream of turbine 112 (e.g., to meet a catalyst minimum temperature, a load requirement, a speed requirement or for another reasons), the controller 140 can increase heating provided to supplemental air by the auxiliary heat source 138 or can optionally decrease airflow from the motive air device 132 to the auxiliary heat source 138 (this provides the reduced airflow entering the auxiliary heat source 138 with a greater degree of heating due to the reduce flow volume) and on to the turbine 112. According to another example, if the temperature of the airflow downstream of turbine 112 is higher than desired (e.g., to meet a catalyst minimum temperature, a load requirement, a speed requirement or for another reasons), the controller 140 can turn off the auxiliary heat source 138 or can optionally increase airflow from the from the motive air device 132 to the auxiliary heat source 138 and on to the turbine 112.

The above detailed description is intended to be illustrative, and not restrictive. The scope of the disclosure should, therefore, be determined with references to the appended claims, along with the full scope of equivalents to which such claims are entitled.

What is claimed is:

1. An auxiliary system for controlling an enthalpy of air to a turbine of a turbocharger of an internal combustion engine comprising:
    a motive air device configured to receive at least some of the air and produce an airflow of the at least some of the air;
    an auxiliary heat source in selective fluid communication with the motive air device and configured to heat the airflow; and
    a controller configured to control operation of the auxiliary heat source and control the airflow to the turbine based upon at least one of a temperature, a pressure and a mass flow rate of the air upstream of or downstream from the turbine, and further configured to determine the enthalpy of the air upstream or downstream of the turbine, and wherein the air is a combined airflow including an exhaust airflow from the internal combustion engine and the airflow from the motive air device.

2. The auxiliary system of claim 1, further comprising exhaust emissions catalysts in fluid communication with and receiving the air exhausted from the turbine, wherein an amount of heating of the airflow by the auxiliary heat source and a rate of the airflow to the turbine are controlled by the controller to maintain the temperature of the air exhausted by the turbine above a minimum exhaust gas temperature for the exhaust emissions catalysts to achieve one or more target conversion efficiencies.

3. The auxiliary system of claim 1, wherein the motive air device is one of a blower or a supercharger that is driven by a crankshaft of the internal combustion engine, and wherein the auxiliary heat source is one of a combustor or a heater.

4. The auxiliary system of claim 1, wherein the controller is configured to control operation of the motive air device to control the airflow to the turbine.

5. The auxiliary system of claim 1, wherein an amount of heating of the airflow by the auxiliary heat source and a rate of the airflow to the turbine are controlled by the controller to substantially balance at least one of a load response and a speed response of a compressor of the turbocharger with at least one of a load requirement and a speed requirement of the internal combustion engine during a transient operation state of the internal combustion engine.

6. The auxiliary system of claim 1, wherein the controller is configured to control operation of the auxiliary heat source and control the airflow to the turbine based upon one or more requirements of exhaust emissions catalysts positioned downstream of and in fluid communication with the turbine.

7. An auxiliary system for controlling an enthalpy of air to a turbine of a turbocharger of an internal combustion engine comprising:
    a motive air device configured to receive at least some of the air and produce an airflow of the at least some of the air;
    an auxiliary heat source in selective fluid communication with the motive air device and configured to heat the airflow;
    a valve assembly positioned between the motive air device and the auxiliary heat source, wherein the valve assembly comprises a three-way valve configured to selectively regulate the airflow to ambient according to at least one operation mode; and
    a controller configured to control operation of the auxiliary heat source and control the airflow to the turbine based upon at least one of a temperature, a pressure and a mass flow rate of the air upstream of or downstream from the turbine, and further configured to control the valve assembly to regulate the airflow from the motive air device to the auxiliary heat source.

8. A method of controlling one or more properties of air to a turbine of a turbocharger of an internal combustion engine comprising:
flowing at least a portion of the air to the turbine from a supplemental positive airflow generating device;
heating the at least the portion of the air to the turbine with an auxiliary heat source;
sensing at least one of at least one of a temperature, a pressure and a mass flow rate of the air upstream or downstream of the turbine;
based upon the sensing, controlling, with a computing device, the flowing of the at least the portion of the air to the turbine; and
based upon the sensing, controlling, with the computing device, an amount of heating applied by the auxiliary heat source to the at least the portion of the air to the turbine.

9. The method of claim 8, wherein the controlling with the computing device the flowing of the at least the portion of the air to the turbine includes regulating the at least the portion of the air with a valve assembly.

10. The method of claim 9, wherein the regulating includes directing at least some of the at least the portion of the air to the turbine to atmosphere rather than to the turbine.

11. The method of claim 8, wherein the controlling with the computing device the flowing of the at least the portion of the air to the turbine includes varying a speed of a motive air device that generates the flowing of the at least the portion of the air to the turbine.

12. The method of claim 8, further comprising passing the air from the turbine through exhaust emissions catalysts in fluid communication therewith, wherein the controlling the amount of heating applied by the auxiliary heat source and the controlling the flowing of the at least the portion of the air to the turbine are controlled by the computing device to maintain the temperature of the air exhausted by the turbine above a minimum exhaust gas temperature for the exhaust emissions catalysts to achieve one or more target conversion efficiencies.

13. The method of claim 8, wherein the amount of heating applied by the auxiliary heat source and the controlling the flowing of the at least the portion of the air to the turbine are controlled by the computing device to substantially balance at least one of a load response and a speed response of a compressor of the turbocharger with at least one of a load requirement and a speed requirement of the internal combustion engine during a transient operation state of the internal combustion engine.

14. The method of claim 8, wherein the amount of heating applied by the auxiliary heat source and the controlling the flowing of the at least the portion of the air to the turbine are controlled by the computing device based upon one or more requirements of exhaust emissions catalysts positioned downstream of and in fluid communication with the turbine.

15. The method of claim 8, wherein the computing device is configured to determine an enthalpy of the air upstream or downstream of the turbine, and wherein the air is a combined airflow including an exhaust airflow from the internal combustion engine and an airflow of the at least the portion of the air.

16. An internal combustion engine comprising:
an engine block including a plurality of combustion chambers, each of the plurality of combustion chambers being in fluid communication with an air intake manifold and an exhaust manifold;
a turbocharger including a compressor shafted to a turbine, wherein the turbine is in fluid communication with the exhaust manifold; and
an auxiliary system comprising:
a motive air device in selective fluid communication with and configured to produce an airflow to the turbine;
an auxiliary heat source in selective fluid communication with the motive air device and configured to heat the airflow produced by the motive air device; and
a controller configured to control operation of the auxiliary heat source and control the airflow to the turbine based upon at least one of a temperature, a pressure and a mass flow rate of a combined airflow including an exhaust airflow from the exhaust manifold and the airflow at a location upstream of or downstream from the turbine.

17. The internal combustion engine of claim 16, further comprising exhaust emissions catalysts in fluid communication with and receiving the combined airflow exhausted from the turbine, wherein an amount of heating of the airflow by the auxiliary heat source and a rate of the airflow to the turbine are controlled by the controller to maintain the temperature of the combined airflow exhausted by the turbine above a minimum exhaust gas temperature for the exhaust emissions catalysts to achieve one or more target conversion efficiencies.

18. The internal combustion engine of claim 16, wherein an amount of heating of the airflow by the auxiliary heat source and a rate of the airflow to the turbine are controlled by the controller to substantially balance at least one of a load response and a speed response of the compressor with at least one of a load requirement and a speed requirement of the internal combustion engine during a transient operation state of the internal combustion engine.

* * * * *